United States Patent [19]
Yomogita

[11] Patent Number: 5,529,134
[45] Date of Patent: Jun. 25, 1996

[54] TRAVELING CONTROL EQUIPMENT OF CONSTRUCTION MACHINE

[75] Inventor: Makoto Yomogita, Hirakata, Japan

[73] Assignee: Kabushiki Kaisha Komatsu Seisakusho, Tokyo, Japan

[21] Appl. No.: 403,711

[22] PCT Filed: Sep. 22, 1993

[86] PCT No.: PCT/JP93/01358

§ 371 Date: Mar. 16, 1995

§ 102(e) Date: Mar. 16, 1995

[87] PCT Pub. No.: WO94/06974

PCT Pub. Date: Mar. 3, 1994

[30] Foreign Application Priority Data

Sep. 22, 1992 [JP] Japan ...................... 4-277819

[51] Int. Cl.⁶ ........................................ B62D 11/04
[52] U.S. Cl. .................... 180/6.2; 180/6.48; 180/315; 180/326; 364/424.07
[58] Field of Search ...................... 180/6.2, 6.48, 180/6.58, 6.5, 305, 308, 315, 326, 329, 332; 364/424.01, 424.07

[56] References Cited

U.S. PATENT DOCUMENTS

| | | | |
|---|---|---|---|
| 4,478,308 | 10/1984 | Klaassen | 180/326 |
| 4,599,855 | 7/1986 | Seelman | 180/6.48 X |
| 4,699,239 | 10/1987 | Ishino et al. | 180/315 |
| 5,263,901 | 11/1993 | Kawakami et al. | 180/6.48 |
| 5,282,516 | 2/1994 | Price | 180/6.48 X |

FOREIGN PATENT DOCUMENTS 2-73475  6/1990  Japan .
2-84862  7/1990  Japan .

*Primary Examiner*—Margaret A. Focarino
*Assistant Examiner*—Victor E. Johnson
*Attorney, Agent, or Firm*—Richards, Medlock & Andrews

[57] ABSTRACT

According to the present invention, front visibility is improved, entry into a cab or exit therefrom by an operator is facilitated, fine operability by a traveling pedal is improved, and foot fatigue is decreased. To achieve this, when the palm rest (56) is detected in its neutral position N, forward or rearward speed signals for respective traveling hydraulic motors in response to detection signals of control input detectors (19a, 20a) of left and right traveling knobs (19, 20) are outputted to respective control valves from a controller (15). When the palm rest is not detected in its neutral position N, the larger one of the detection signals issued from these control input detectors (19a, 20a) is converted into the forward or rearward speed signals for the left and right traveling hydraulic motors (9, 10) in response to a detection signal of the control input detector (21a) of the traveling pedal (21), and a smaller detection signal issued from one of these control input detectors (19a, 20a) causes the controller (15) to output the forward or rearward speed signals for the left and right traveling hydraulic motors (9, 10) in accordance with a product of a ratio of the smaller detection signal to the larger detection signal and the detection signal issued from the control input detector (21a) of the traveling pedal (21), and the forward or rearward speed signals are outputted to respective control valves from the controller (15).

17 Claims, 8 Drawing Sheets

TRAVELING CONTROL EQUIPMENT OF CONSTRUCTION MACHINE

FIELD OF THE INVENTION

The present invention relates to a traveling control equipment of a tracked construction machine, such as a hydraulic excavator.

BACKGROUND ART

FIG. 7 is a general view of a tracked hydraulic excavator. The reference numeral 1 denotes an upper revolving works; 2, an undercarriage; and 3, a working unit. The undercarriage 2 is provided with tracks 4, 5 at the left and right thereof. The left and right tracks 4, 5 are driven by a sprocket 6 which is in turn driven by a hydraulic motor, and thus the vehicle travels. The reference numeral 7 denotes a cab, which faces in a direction depicted by an arrow. Steering is performed by changing a travel speed of the left and right tracks 4, 5 or reversing a traveling direction thereof. The upper revolving works 1 can swing 360° with respect to the undercarriage 2.

FIG. 8 is a side view showing a conventional cab of a hydraulic excavator, FIG. 9 is a plan view of the cab, and FIG. 10 is a front view of the cab. Left and right traveling levers 81, 82 and left and right traveling pedals 83, 84 are disposed ahead of a seat 80. The left traveling lever 81 and the left traveling pedal 83 are secured to each other. The right traveling lever 82 and the right traveling pedal 84 are also secured to each other. The reference numerals 85 and 86 denote left and right foot rests, and 90 and 91 indicate left and right working unit control levers.

As for traveling operations, when the left traveling lever 81 or the left traveling pedal 83 is pivoted forwardly, the left track 4 moves forwardly. Also, pivoting the left traveling lever 81 or the left traveling pedal 83 rearwardly causes the track 4 to move rearwardly. When the right traveling lever 82 or the right traveling pedal 84 is pivoted forwardly or rearwardly, the right track 5 moves forwardly or rearwardly. The traveling speed is proportional to a control input of the traveling levers or the traveling pedals. Operating either one of the traveling levers or one of the traveling pedals causes an on-the-spot turn. While operating the left and right traveling levers 81, 82 or the left and right traveling pedals 83, 84 in the same direction, changing the left and right control inputs causes the vehicle to make a slow turn. Operating the left and right traveling levers 81, 82 or the left and right traveling pedals 83, 84 in opposite directions to each other causes the vehicle to make a quick on-the-spot turn.

According to the above mentioned construction, the left and right traveling levers 81, 82 or the left and right traveling pedals 83, 84, disposed ahead of the seat 80, are operated for traveling the vehicle or for making an on-the-spot or a quick on-the-spot turn. However, this involves the following problems:

(1) The left and right traveling levers 81, 82 obstruct the front visibility.

(2) When an operator sits in or leaves the seat 80, the left and right traveling levers 81, 82 are in the operator's way.

(3) When the operator looks ahead and down for deep excavation, the left and right traveling levers 81, 82 obstruct the view of the excavation work.

(4) When the operator steps on the left and right traveling pedals 83, 84 for operation thereof, the left and right traveling levers 81, 82 abut the operator's feet to interfere with the foot operation.

(5) When the left and right traveling levers 81, 82 oscillate due to vibrations of the body of the vehicle, the vehicle may move. To prevent this, it is necessary to employ a strong spring, damper and the like for maintaining neutrality. However, a poor return due to a spring force or damper causes hindrance to traveling operations with a resultant difficulty in a fine operation.

(6) Since the left and right traveling pedals 83, 84 are in a balance-like structure, the position of a fulcrum is indefinite with a resultant difficulty in a fine operation.

(7) For pivoting the left and right traveling pedals 83, 84 rearwardly, a heel is used to step on them. This operation, however, is hard to perform.

(8) A composite operation requires the concurrent use of both feet.

SUMMARY OF THE INVENTION

The present invention is made with respect to the above mentioned conventional problems, and an object thereof is to provide a traveling control equipment for construction machine capable of solving all of the problems (1)–(8) described above.

According to the present invention, a traveling control equipment having a hydraulic pump, left and right traveling hydraulic motors, and control valves arranged in hydraulic lines connecting the hydraulic pump and traveling hydraulic motors together comprises: a palm rest having a mechanism for holding it at neutral, forward, and rearward positions; a neutral position detector of the palm rest; a control input detector of a traveling pedal; control input detectors of right and left traveling knobs; and a controller to output predetermined forward or rearward speed signals for the left and right traveling hydraulic motors to the control valves.

When the controller detects the palm rest being in its neutral position and the detection signals of the detectors are inputted thereto, the controller outputs to the control valves the forward or rearward speed signals for the left and right traveling hydraulic motors in response to the detection signals of the control input detectors of the left and right traveling knobs.

When the controller does not detect the palm rest in its neutral position and the detection signals of the detectors are inputted thereto, the controller converts the larger one of the detection signals issued from the control input detectors of the left and right traveling knobs into the forward or rearward speed signals for the left and right traveling hydraulic motors in response to a detection signal of the control input detector of the traveling pedal, converts the smaller one of the detection signals issued from the control input detectors of the left and right traveling knobs into the forward or rearward speed signals for the left and right traveling hydraulic motors in accordance with a product of the detection signal issued from the control input detector of the traveling pedal and a ratio of the smaller detection signal to the larger detection signal, and outputs the thus converted signals to the control valves.

In addition, a console box provided with the palm rest and the left and right traveling knobs can move in the front-rear direction of the vehicle with respect to the cab and also be fixed at a predetermined position.

First, when the palm rest having the mechanism for holding it at neutral, forward, and rearward positions is held at the neutral position, the detection signals issued from the neutral position detector to detect the neutral position of the palm rest, the control input detector of the traveling pedal, and the control input detectors of the left and right traveling knobs are inputted to the controller. The controller cuts the control input detection signal of the traveling pedal and outputs to the control valves the forward or rearward speed signals for the left and right traveling hydraulic motors in response to the detection signals of the control input detectors of the left and right traveling knobs. Then, the control valves feed hydraulic oil discharged from the oil pump to the left and right traveling hydraulic motors through the hydraulic lines in response to the forward or rearward speed signals. As a result, the left and right traveling hydraulic motors are driven in accordance with the control inputs of the left and right traveling knobs, and thus the vehicle can be operated for traveling.

Next, when the palm rest is held at the forward or rearward position, the detection signals issued from the control input detector of the traveling pedal and the control input detectors of the left and right traveling knobs are inputted to the controller. The controller converts the larger one of the detection signals issued from the control input detectors of the left and right traveling knobs into the forward or rearward speed signals for the left and right traveling hydraulic motors in response to the detection signal of the control input detector of the traveling pedal. Also, the controller converts the smaller one of the detection signals issued from the control input detectors of the left and right traveling knobs into the forward or rearward speed signals for the left and right traveling hydraulic motors in accordance with a product of the detection signal issued from the control input detector of the traveling pedal and a ratio of the smaller detection signal to the larger detection signal. Then, the controller outputs the thus converted signals to the control valves. Then, the control valves feed hydraulic oil discharged from the oil pump to the left and right traveling hydraulic motors through the hydraulic lines in response to the forward or rearward speed signals for the left and right traveling hydraulic motors. As a result, the left and right traveling hydraulic motors are driven in accordance with the control inputs of the left and right traveling knobs, and thus the vehicle can be operated for traveling.

Furthermore, a console box provided with the palm rest and the left and right traveling knobs can move in step with the forward or rearward movement of the operator seat, thus improving operability.

BEST MODE FOR CARRYING OUT THE INVENTION

Figure 1:
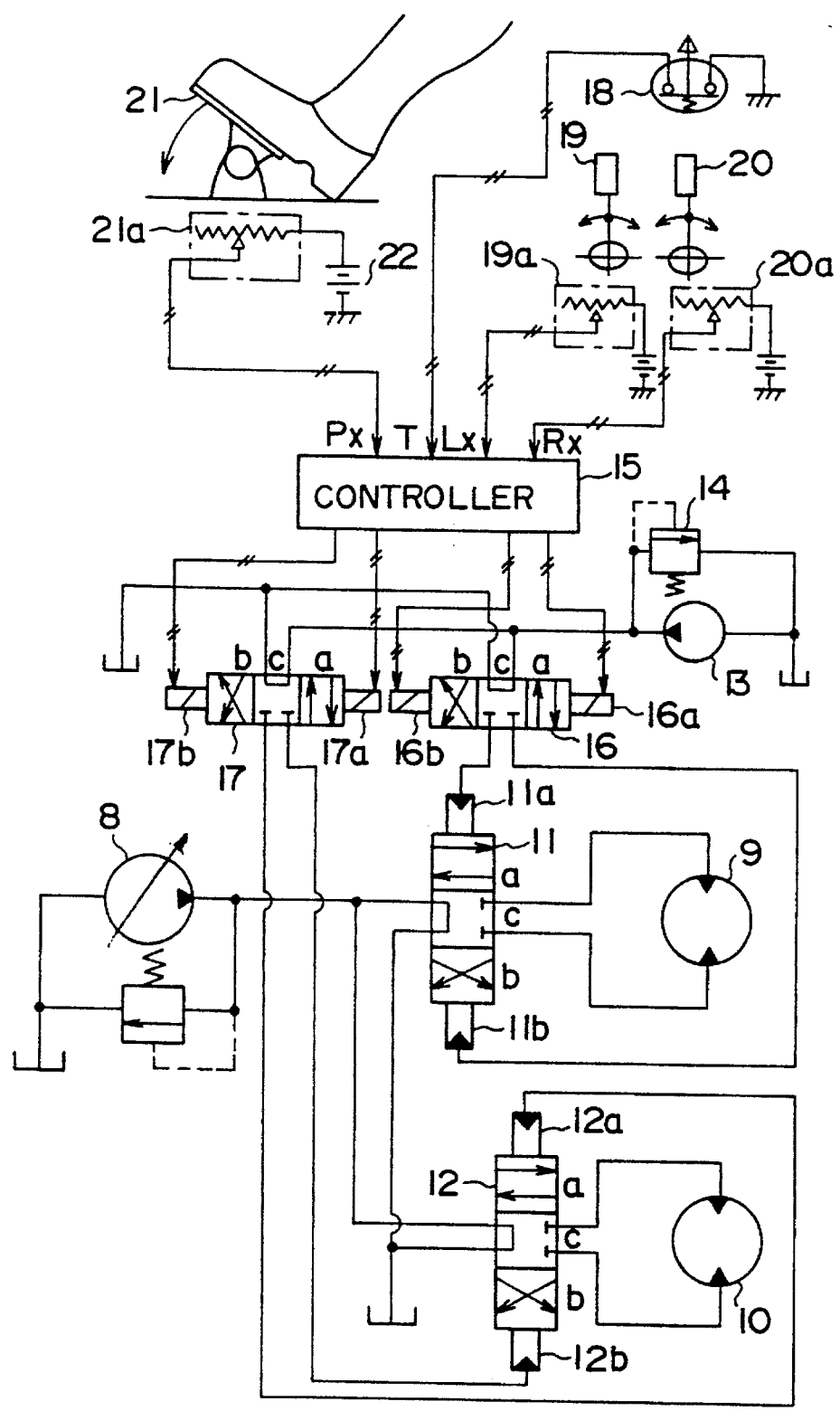
FIG. 1 is a diagram showing a control circuit according to an embodiment of the present invention.

In FIG. 1, showing a control circuit of the present embodiment, the reference numeral 8 denotes a hydraulic pump; 9 is a left traveling hydraulic motor; 10 is a right traveling hydraulic motor; 11 is a control valve for the left traveling hydraulic motor 9; 12 is a control valve for the right traveling hydraulic motor 10; 11a and 11b are hydraulic pilot ports of the control valve 11; 12a and 12b are hydraulic pilot ports of the control valve 12; 13 is a pilot pump; and 14 is a pilot pressure setting valve. Also, the reference numeral 16 denotes a pilot control valve to supply a pilot pressure to the hydraulic pilot ports 11a, 11b; 17 is a pilot control valve to supply a pilot pressure to the hydraulic pilot ports 12a, 12b; 16a and 16b are solenoids to drive the pilot control valve 16; 17a and 17b are solenoids to drive the pilot control valve 17; and 15 is a controller to output control signals to the solenoids 16a, 16b, 17a, 17b for controlling the circuit. The reference numeral 18 denotes a position detector of a palm rest; 19 is a left traveling knob; 20 is a right traveling knob; 19a and 20a are traveling knob control input detectors to detect a control input of the left traveling knob 19 and the right traveling knob 20, respectively; 21 is a traveling pedal; 21a is a pedal control input detector to detect a control input of the traveling pedal 21; and 22 is a battery.

Figure 2:
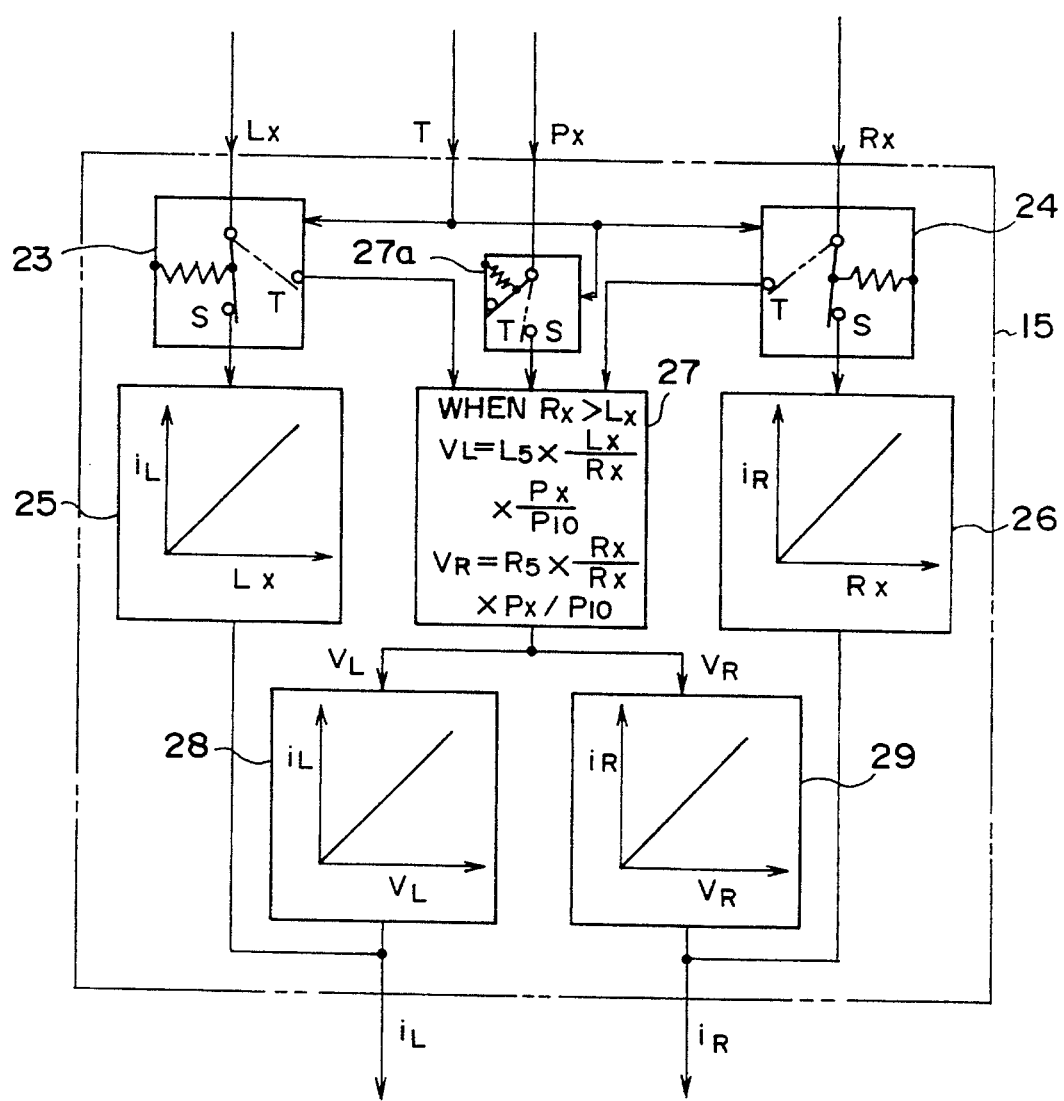
FIG. 2 is a detail view of a controller in FIG. 1.

In FIG. 2, showing the detail of the controller 15, the reference numerals 23 and 24 denote switch circuits, and 25–29 indicate function generators.

Figure 3:
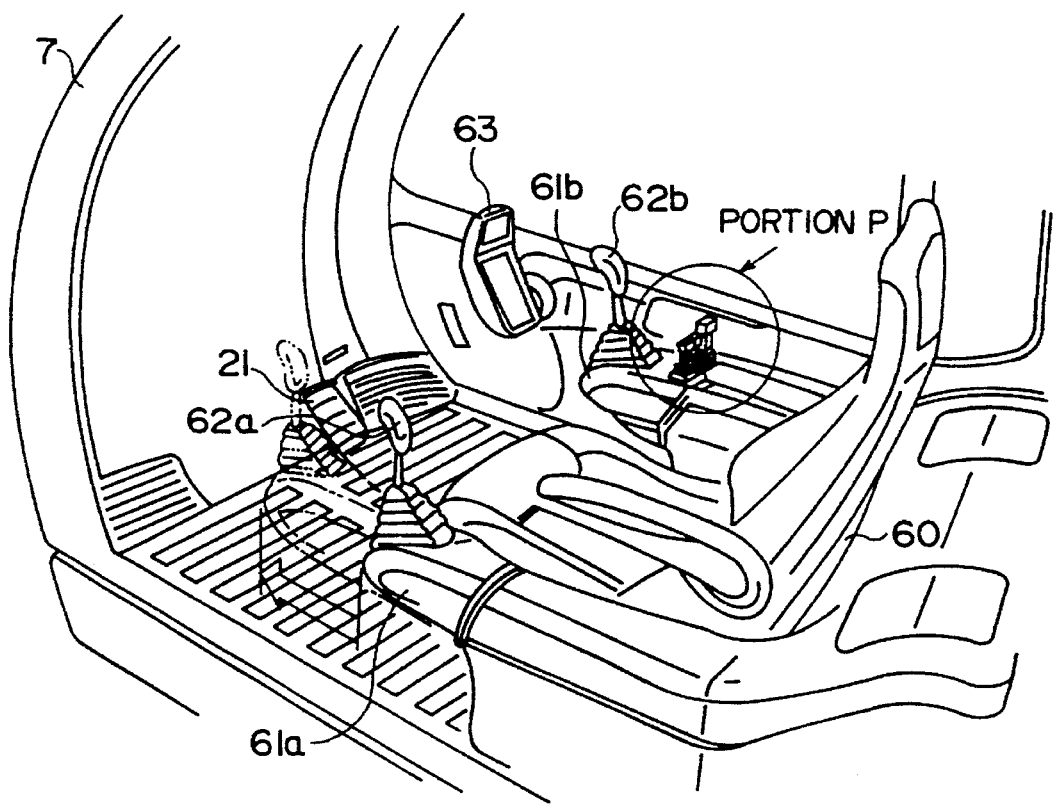
FIG. 3 is a perspective view showing the inside of a cab according to the embodiment.

In FIG. 3, showing the inside of a cab, the reference numeral 7 denotes a cab; 60 is an operator seat; 61a and 61b are console boxes disposed at the left and right sides of the operator seat 60; 62a and 62b are working unit levers provided on the console boxes 61a, 61b; and 63 is a monitor.

Figure 4:
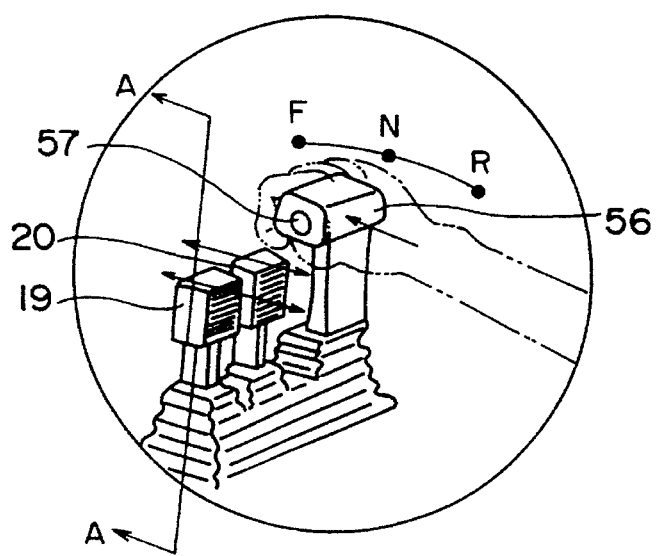
FIG. 4 is a detail view of the portion P in FIG. 3.

In FIG. 4, showing the detail of the portion P of FIG. 3, the reference numeral 56 denotes a palm rest, and 57 indicates an operating button for changing the position of the palm rest 56. The console box 61a, provided with the working unit lever 62a, and the console box 61b, provided with the working unit lever 62b, the palm rest 56 and the left and right traveling knobs 19, 20 slide in the front-rear direction of the vehicle with respect to the cab 7 and are fixed at a predetermined position.

Figure 5A:
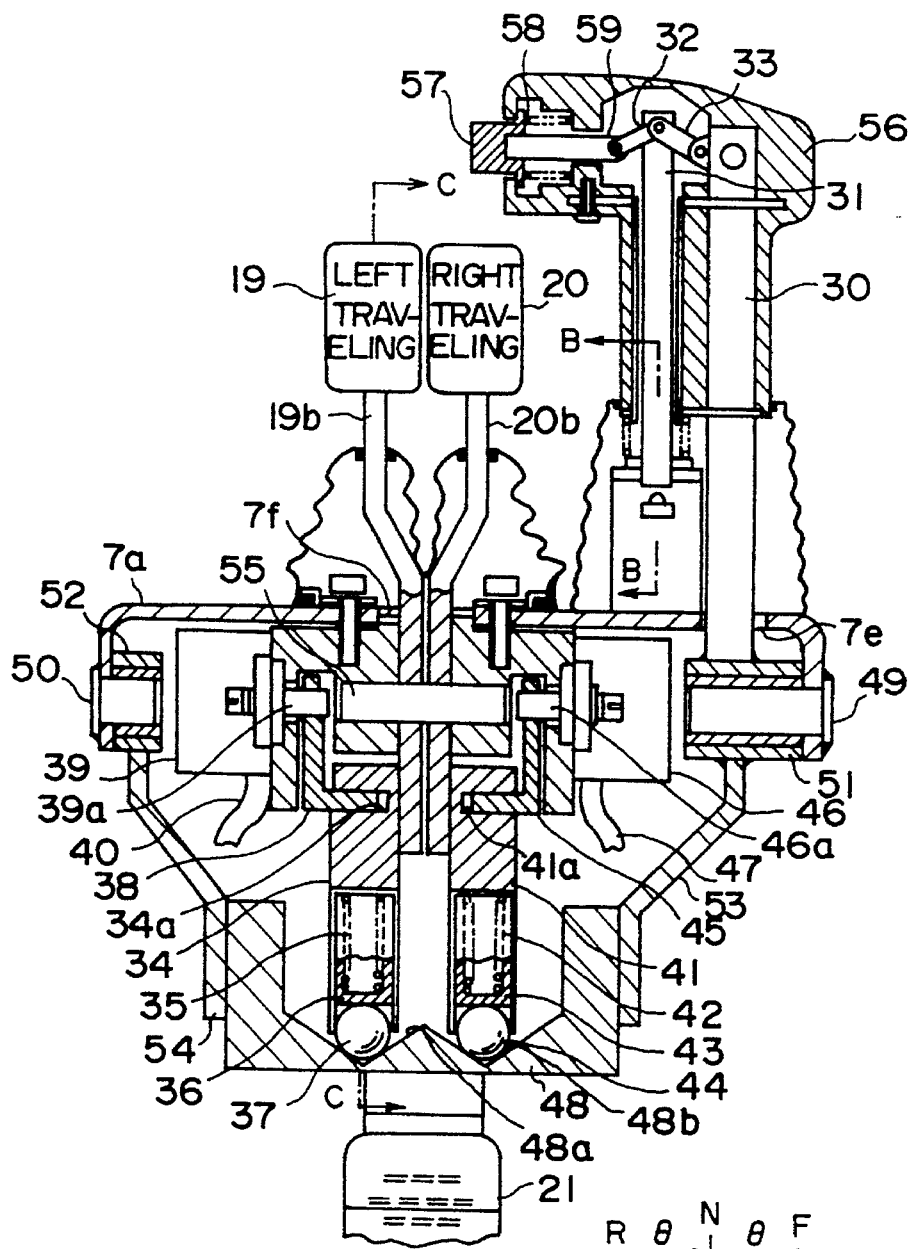
FIG. 5A is a cross-sectional view along line A—A of FIG. 4.
Figure 5B:
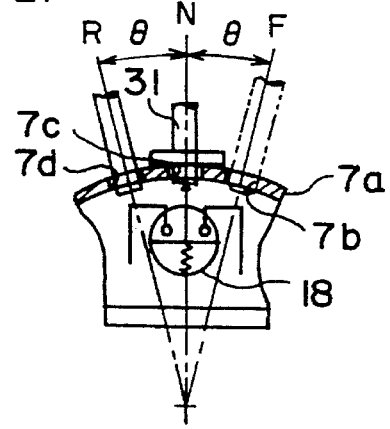
FIG. 5B is a cross-sectional view along line B—B of FIG. 5A.
Figure 5C:
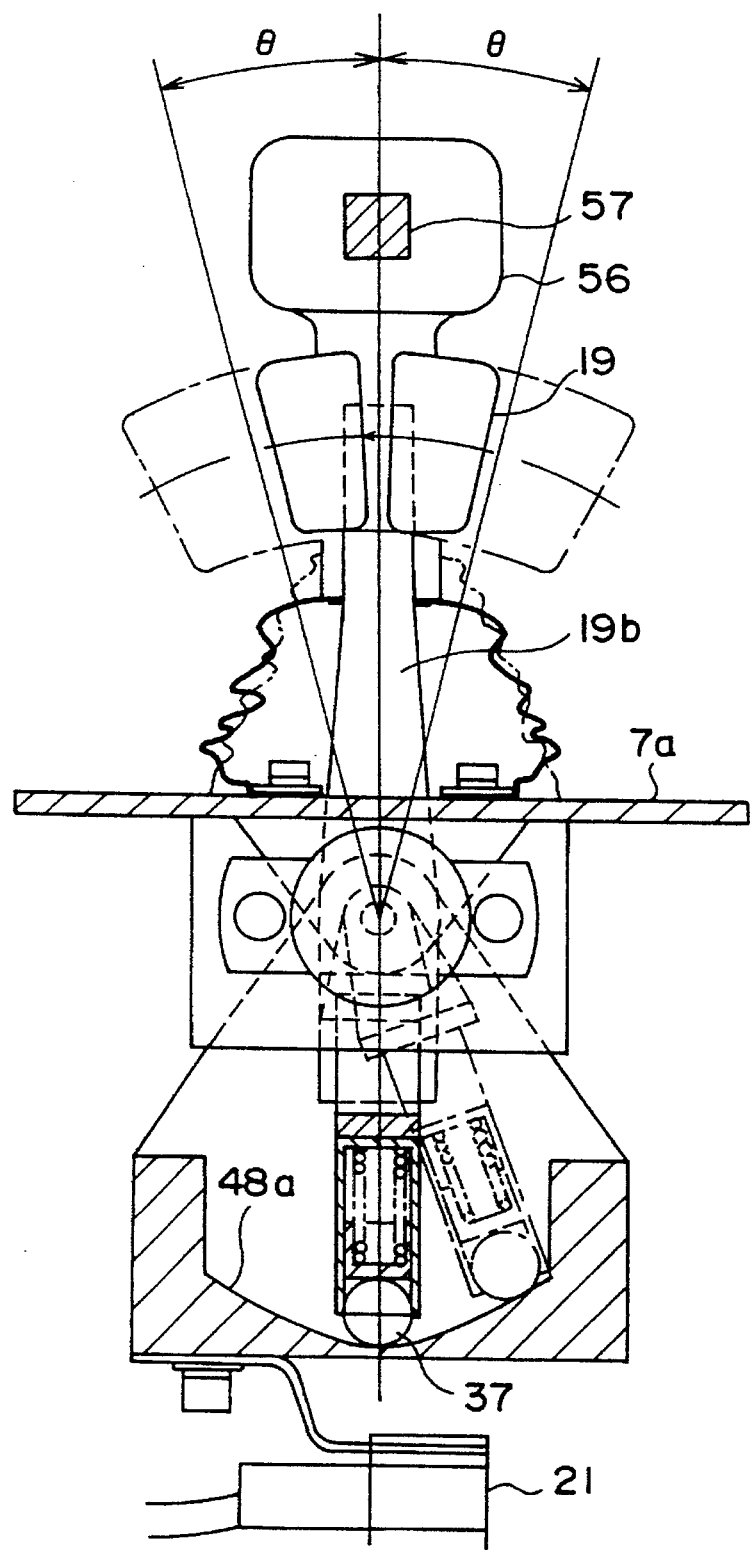
FIG. 5C is a cross-sectional view along line C—C of FIG. 5A.

In FIGS. 5A, 5B and 5C, showing the palm rest 56 and the like of the present embodiment, the reference numeral 58 denotes a spring to force the operating button 57 outwardly; 59 is a rod which slides leftwardly and rightwardly together with the operating button 57 in an integral manner; 30 is a lever fixed within the palm rest 56; 31 is a rod which slides up and down within the palm rest 56; 32 is a link to connect the rod 59 and the rod 31 through a pin; and 33 is a link to connect the rod 31 and the lever 30. The reference numeral 7a denotes a bracket fixed to the cab 7. Holes 7b, 7c, 7d for holding the palm rest 56 at a forward position F, a neutral position N, and a rearward position R; a slot 7e to allow oscillation of the lever 30; and a slot 7f to allow oscillation of the left and right traveling levers 19b, 20b, are cut in the bracket 7a.

Furthermore, the reference numeral 34 denotes a cylinder fixed to the lower end of the left traveling lever 19b; 35 is a spring; 36 is a piston forced outwardly by the spring 35; and 37 is a ball forced outwardly by the spring 35 through the piston 36. The reference numeral 38 denotes a lever engaged with a hole 34a in the cylinder 34, and 39 indicates a potentiometer. A rotational spindle 39a of the potentiometer 39 is fixed to the lever 38. An output from the potentiometer 39 is inputted to the controller 15 through wiring 40. The construction of elements 41–47 for the right traveling lever 20b is similar to that for the left traveling lever 19b, and hence description thereof is omitted.

The reference numeral 48 denotes a guide member secured to the right and left bosses 51, 52 through the right and left brackets 53, 54. These bosses 51, 52 are rotatably fitted to the right and left spindles 49, 50 fixed on the bracket 7a. The righthand boss 51 is also secured to the lever 30 within the palm rest 56. The reference numerals 48a and 48b denote guide grooves for the balls 37, 44 to roll therein, and 55 indicates a center spindle of oscillation for the left and right traveling levers 19b, 20b.

Next, operations of the control circuit will be described.

When a holding position signal T of the palm rest 56, outputted from the position detector 18, control input signals $L_x$ and $R_x$ of the left and right traveling knobs 19, 20 outputted from the left and right traveling lever control input detectors 19a, 20a, and a control input signal $P_x$ of the traveling pedal 21, outputted from the pedal control input detector 21a, are inputted to the controller 15, the controller 15 executes an arithmetic operation depicted in FIG. 2 and then outputs control signals $i_L$ and $i_R$ to the solenoids 16a, 16b of the pilot control valve 16 and the solenoids 17a, 17b of the pilot control valve 17, respectively. The arithmetic operations depicted in FIG. 2 will be described in detail later.

The pilot control valves 16 and 17 reduce a hydraulic pressure of the pilot pump 13 in response to the control signals $i_L$ and $i_R$, which hydraulic pressure is set at a fixed pressure by the pilot pressure setting valve 14, and supply the thus reduced pressure to the pilot cylinders 11a, 11b, 12a, 12b of the control valves 11 and 12. The control valves 11 and 12 are controlled in accordance with the thus reduced pilot pressure. As a result, the hydraulic oil discharged from the hydraulic pump 8 is supplied to the hydraulic motors 9 and 10 in response to the control signals $i_L$ and $i_R$. Thus, the hydraulic motors 9 and 10 are rotated at a speed corresponding to this hydraulic oil rate, and it is possible to operate the vehicle accordingly for traveling.

Next, operations of the palm rest 56 and the like will be described.

(1) When the palm rest 56 is at the neutral position N:

In FIGS. 5A, 5B and 5C, when the operating button 57 is pressed inwardly against the biasing force of the spring 58, the rod 31 moves upwardly through the rod 59 and the links 32, 33. As a result, a lower end of the rod 31 raises out of a holding hole 7b–7d in the bracket 7a. When the palm rest 56 is moved to the neutral position N and then the hand releases the operating button 57, the lower end of the rod 31 enters the holding hole 7c in the bracket 7a. Thus, the palm rest 56 can be held at the neutral position N.

In the state where the palm rest 56 is held at the neutral position N, when the left and right traveling knobs 19, 20 are operated in the forward or rearward direction, the left and right traveling levers 19b, 20b oscillate about the center spindle of oscillation 55 fixed to the bracket 7a in accordance with a control input thereof. This oscillation causes a change in the resistance value of the left and right potentiometers 39, 46 through the left and right levers 38, 45 and the rotational spindles 39a, 46a. The outputs $L_x$ and $R_x$ from the potentiometers 39, 46 are outputted to the controller 15 through wirings 40, 47. An operating physical force of the left and right traveling knobs 19, 20 is adapted to gradually increase as a control input increases in the forward or rearward direction from the neutral position N, by changing a biasing force of the springs 35, 42 applied to the balls 37, 44 which roll in the guide grooves 48a, 48b in the guide member 48.

Thus, in the state where the palm rest 56 is held at the neutral position N, the lower end of the rod 31 presses the position detector 18 of the palm rest 56 downwardly, and hence the position detector 18 is OFF. Accordingly, the holding position signal T in FIG. 2 is shut off, and the switch circuits 23, 24 make contact with contact S as depicted by a solid line. As a result, the control input signals $L_x$ and $R_x$ of the left and right traveling knobs 19, 20, outputted from the left and right traveling lever control input detectors 19a, 20a, are outputted to the respective function generators 25, 26. The function generators 25, 26 output the control signals $i_L$ and $i_R$ in response to the control input signals $L_x$ and $R_x$.

Since the holding position signal T is shut off, the switch circuit 27a makes contact with the contact T. Accordingly, the control input signal $P_x$ of the traveling pedal 21, outputted from the pedal control input detector 21a, is not inputted to the function generator 27.

Figure 6:
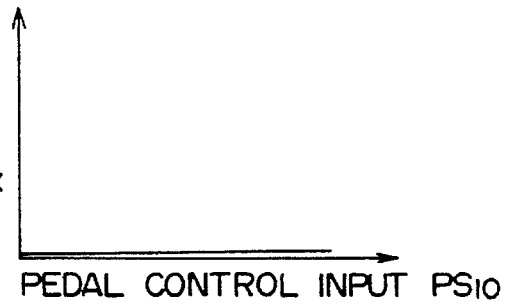
FIG. 6 is a diagram showing the relationship between a control input of a traveling pedal or a traveling knob and a pedal signal or a knob signal in the embodiment.
Figure 7:
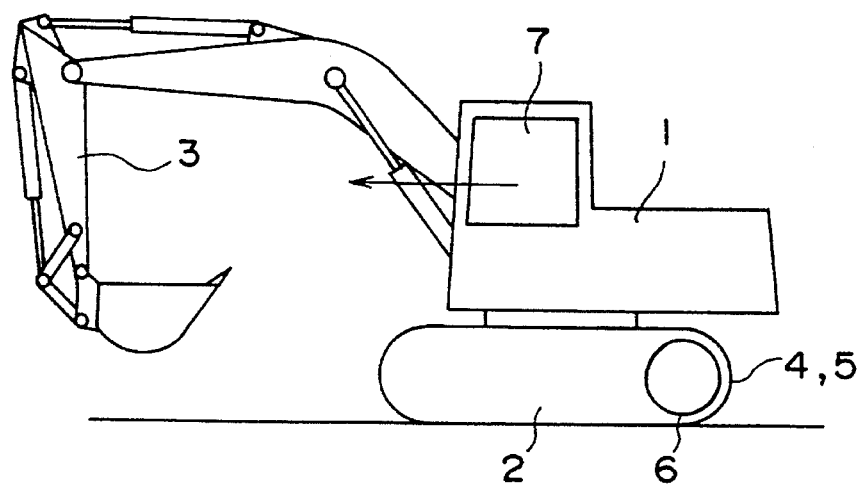
FIG. 7 is a general view showing a tracked hydraulic excavator.
Figure 8:
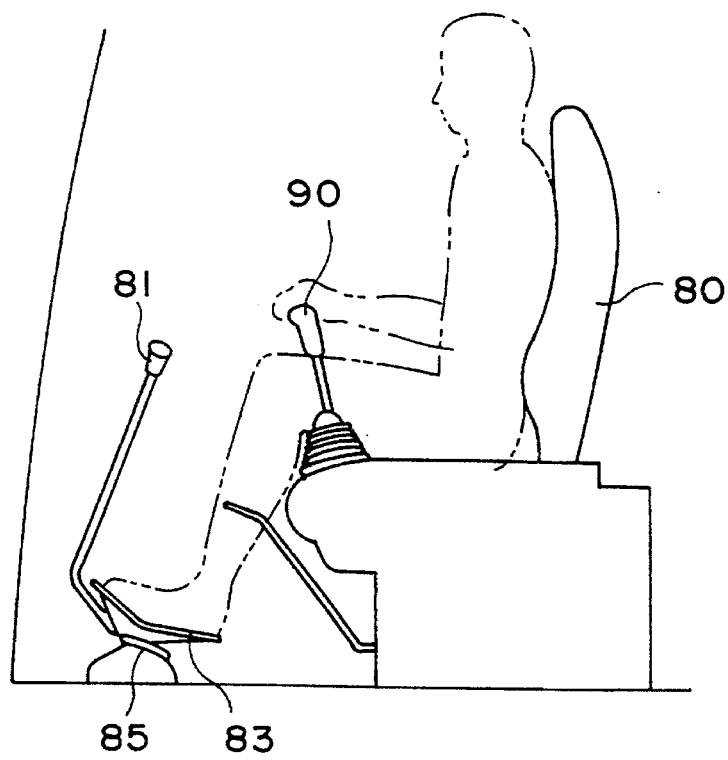
FIG. 8 is a side view of a conventional cab of a hydraulic excavator.
Figure 9:
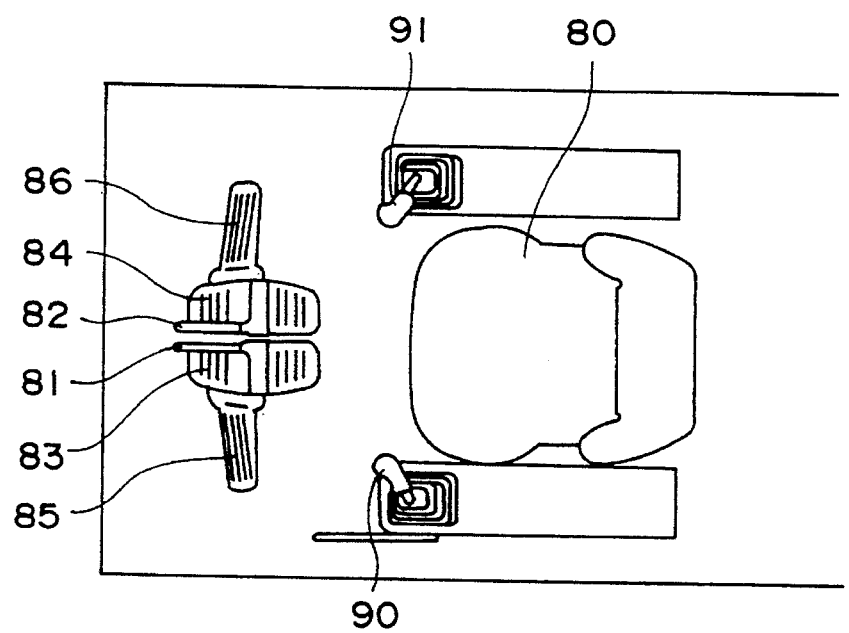
FIG. 9 is a plan view of FIG. 8.
Figure 10:
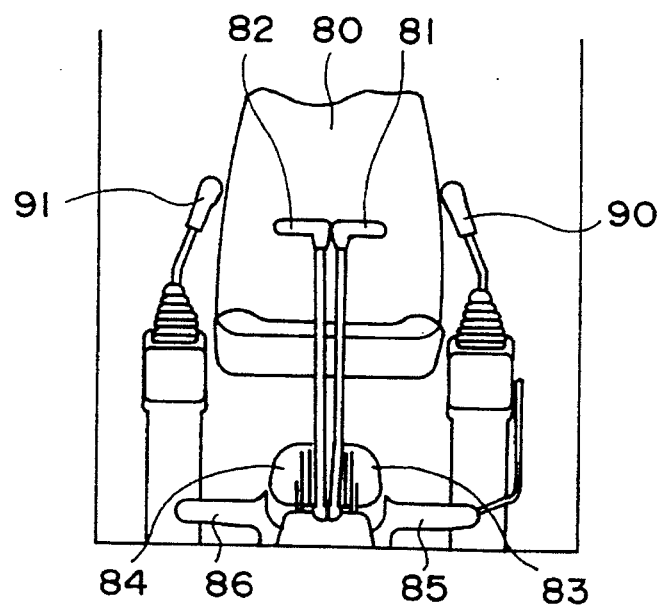
FIG. 10 is a front view of FIG. 8.

Thus, as shown at an upper part of the diagram of FIG. 6, the control signals $i_L$ and $i_R$ which are determined, irrespective of the control input signal $P_x$ of the traveling pedal 21, by the control input signals $L_x$ and $R_x$ corresponding to lever strokes $LS_x$ and $RS_x$ from the neutral position N of the left and right traveling knobs 19, 20, are outputted from the controller 15 to respective solenoids 6a, 16b, and 17a, 17b of the pilot control valves 16, 17. Accordingly, the vehicle is operated for traveling in accordance with a control input of the left and right traveling knobs 19, 20.

(2) When the palm rest is at the forward position F or rearward position R:

In FIGS. 5A, 5B and 5C, when the operating button 57 is pressed inwardly against the biasing force of the spring 58, the rod 31 moves upwardly through the rod 59 and the links 32, 33. As a result, the lower end of the rod 31 raises out of the neutral position holding hole 7c in the bracket 7a. The palm rest 56 is moved from the neutral position N to the forward position F or the rearward position R. When the hand releases the operating button 57, the lower end of the rod 31 engages with the holding hole 7b or 7d in the bracket 7a. Thus, the palm rest 56 can be held at the forward position F or the rearward position R.

The left and right traveling knobs 19, 20 are operated in the neutral-to-rearward direction in the state where the palm rest 56 is held at the forward position F, or the left and right traveling knobs 19, 20 are operated in the neutral-to-forward direction in the state where the palm rest 56 is held at the rearward position R. Then, the left and right traveling levers 19b, 20b oscillate about the center spindle of oscillation 55 fixed to the bracket 7a in accordance with the control input $LS_x$ or $RS_x$. This oscillation causes a change in a resistance value of the potentiometers 39, 46 through the levers 38, 45 and the rotational spindles 39a, 46a. The outputs $L_x$ and $R_x$ from the potentiometers 39, 46 are outputted to the controller 15 through wirings 40, 47. An operating physical force of the left and right traveling knobs 19, 20 is adapted to gradually increase as a control input in the forward or rearward direction from the neutral position N increases, by changing the biasing force of the springs 35, 42 applied to the balls 37, 44 which roll in the guide grooves 48a, 48b in the guide member 48.

Thus, in the state where the palm rest 56 is held at the forward position F or the rearward position R, the lower end of the rod 31 does not press the position detector 18 of the palm rest 56 downwardly, and hence the position detector 18 is ON. Accordingly, the holding position signal T in FIG. 2 is inputted to the controller 15, and the switch circuits 23, 24 make contact with contact T as depicted by a two-dots-and-dash line. As a result, the control input signals $L_x$ and $R_x$ of the left and right traveling knobs 19, 20, outputted from the left and right traveling lever control input detectors 19a, 20a, are outputted to the function generator 27.

Since the holding position signal T causes the switch circuit 27a to make contact with the contact S, as depicted by a two-dots-and-dash line, the control input signal $P_x$ of the traveling pedal 21 outputted from the pedal control input detector 21a is inputted to the function generator 27. The function generator 27 calculates travel speeds, $V_L$ and $V_R$, from the control input signals $L_x$, $R_x$ and $P_x$ and the control input signals $L_5$, $R_5$ and $P_{10}$, which are the control input signals $L_x$, $R_x$ and $P_x$ at a full stroke, as follows.

When $R_x > L_x$ $$V_L = L_5 \cdot L_x / R_x \cdot P_x / P_{10}$$

$$V_R = R_5 \cdot R_x / R_x \cdot P_x / P_{10} \qquad \text{Exp. (1)}$$

With $L_5 = R_5$, then $$V_R = L_5 \cdot P_x / P_{10}$$

Then $$V_L = V_R \cdot L_x / R_x \qquad \text{Exp. (2)}$$

When these values $V_L$ and $V_R$ are outputted to the function generators 28, 29, the function generators 28, 29 output the control signals $i_L$ and $i_R$ in accordance with the values $V_L$ and $V_R$.

Accordingly, as shown at a lower part of a diagram in FIG. 6, the travel speed $V_R$, corresponding to the larger one of the control input signals $R_x$ and $L_x$ of the left and right traveling knobs 19, 20, is proportional to the control input signal $P_x$ of the traveling pedal 21 (see Exp. (1)).

The travel speed $V_L$, corresponding to the smaller one of the control input signals $L_x$ and $R_x$ of the left and right traveling knobs 19, 20, is proportional to a product of the travel speed $V_R$ corresponding to the larger control input signal $R_x$ and a ratio of the smaller control input signal $L_x$ to the larger control input signal $R_x$ (see Exp. (2)). The vehicle is operated for traveling in accordance with the travel speeds $V_L$ and $V_R$.

The contents of the case of $L_x > R_x$ are similar to those for the case of $R_x > L_x$ described above, and hence the description thereof is omitted.

INDUSTRIAL APPLICABILITY

The present invention is effective to serve as a traveling control equipment of construction machine capable of improving front visibility, facilitating entry into the cab or exit therefrom by an operator, improving fine operability by a traveling pedal, and decreasing foot fatigue.

What is claimed is:

1. A traveling control equipment suitable for use with a construction machine having a hydraulic pump, left and right traveling hydraulic motors, and control valves arranged in hydraulic lines connecting the hydraulic pump and the traveling hydraulic motors together, said traveling control equipment comprising:

a palm rest;

a mechanism for selectively holding said palm rest at neutral, forward, and rearward positions;

a position detector for providing a position signal responsive to a position of said palm rest;

a traveling pedal;

a control input detector for providing a pedal control signal responsive to a control input via said traveling pedal;

a left traveling knob and a right traveling knob;

a left control input detector for providing a left control input signal responsive to a control input via said left traveling knob;

a right control input detector for providing a right control input signal responsive to a control input via said right traveling knob; and a controller for receiving said position signal, said pedal control signal, said left control input signal and said right control input signal, and outputting to said control valves forward or rearward speed signals for the left and right traveling hydraulic motors.

2. A traveling control equipment in accordance with claim 1, wherein said position detector provides said position signal when said palm rest is in said neutral position.

3. A traveling control equipment in accordance with claim 1, wherein when said position detector detects said palm rest in said neutral position, and said left control input signal is inputted to said controller, said controller outputs to the control valve for the left traveling hydraulic motor a forward or rearward speed signal in response to said left control input signal.

4. A traveling control equipment in accordance with claim 1, wherein when said position detector detects said palm rest in said neutral position, and said right control input signal is inputted to said controller, said controller outputs to the control valve for the right traveling hydraulic motor a forward or rearward speed signal in response to said right control input signal.

5. A traveling control equipment in accordance with claim 1, wherein when said position detector detects said palm rest in said neutral position, and said left control input signal and said right control input signal are inputted to said controller, said controller outputs to said control valves the forward or rearward speed signals for the left and right traveling hydraulic motors in response to the left control input signal and the right control input signal.

6. A traveling control equipment in accordance with claim 1, wherein when said position detector does not detect said palm rest in said neutral position, and said pedal control signal, said left control input signal and said right control input signal are inputted to said controller, said controller converts a larger one of said left control input signal and said right control input signal into a forward or rearward speed signal of one of the left and right traveling hydraulic motors in response to said pedal control signal, converts a smaller one of said left control input signal and said right control input signal into a forward or rearward speed signal of the other one of the left and right traveling hydraulic motors in accordance with a product of said pedal control signal and a ratio of said smaller one to said larger one, and outputs the thus converted signals to said control valves.

7. A traveling control equipment in accordance with claim 6, wherein when said position detector detects said palm rest in said neutral position, and said left control input signal is inputted to said controller, said controller outputs to the control valve for the left traveling hydraulic motor a forward or rearward speed signal in response to said left control input signal.

8. A traveling control equipment in accordance with claim 6, wherein when said position detector detects said palm rest in said neutral position, and said right control input signal is inputted to said controller, said controller outputs to the control valve for the right traveling hydraulic motor a forward or rearward speed signal in response to said right control input signal.

9. A traveling control equipment in accordance with claim 6, wherein when said position detector detects said palm rest in said neutral position, and said left control input signal and said right control input signal are inputted to said controller, said controller outputs to said control valves the forward or rearward speed signals of the left and right traveling hydraulic motors in response to the left control input signal and the right control input signal.

10. A traveling control equipment in accordance with claim 1, further comprising a console box having a left traveling lever and a right traveling lever mounted on a center spindle for rotation with respect thereto, said left traveling knob being mounted on said left traveling lever, said right traveling knob being mounted on said right traveling lever, said left control input detector providing said left control input signal responsive to a rotary position of said left traveling lever, and said right control input detector providing said right control input signal responsive to a rotary position of said right traveling lever.

11. A traveling control equipment in accordance with claim 10, wherein said left control input detector comprises a potentiometer connected to said left traveling lever, and wherein said right control input detector comprises a potentiometer connected to said right traveling lever.

12. A traveling control equipment in accordance with claim 10, further comprising a bracket having a neutral position hole, a forward position hole, and a rearward position hole, each of said holes representing a corresponding position of said palm rest, a rod associated with said palm rest and said bracket so that an end of said rod extends into one of said holes when said palm rest is at its position which corresponds to said one of said holes.

13. A traveling control equipment in accordance with claim 12, further comprising a mechanism in said palm rest which can be engaged by an operator to raise said rod out of said holes when it is desired to change the position of said palm rest and to lower said rod into one of said holes when it is desired to position said palm rest at its position represented by that hole.

14. A traveling control equipment in accordance with claim 13, wherein said position detector for providing a position signal responsive to a position of said palm rest is mounted adjacent the neutral position hole so that said position detector senses the presence of said rod in said neutral position hole when said palm rest is in its neutral position.

15. A traveling control equipment in accordance with claim 1, wherein a console box provided with said palm rest and said left and right traveling knobs can move in the front-rear direction of a cab of said construction machine.

16. A traveling control equipment in accordance with claim 9, further comprising an operator seat, and a console box connected to said operator seat for movement therewith, said console box being provided with said palm rest and said left and right traveling knobs.

17. A traveling control equipment in accordance with claim 1, wherein said controller comprises a first switching circuit receiving said left control input signal, a second switching circuit receiving said right control input signal, a third switching circuit receiving said pedal control signal, a first function generator, a second function generator, a third function generator, a fourth function generator, and a fifth function generator, wherein said first switching circuit is operated by said position signal to input said left control input signal to said first function generator to produce a control signal for the control valve for said left traveling motor when said palm rest is in its neutral position, wherein said second switching circuit is operated by said position signal to input said right control input signal to said second function generator to produce a control signal for the control valve for said right traveling motor when said palm rest is in its neutral position, wherein said third switching circuit is operated by said position signal to not input said pedal control signal to said third function generator when said palm rest is in its neutral position, and wherein said first switching circuit is operated by said position signal to input said left control input signal to said third function generator when said palm rest is not in its neutral position, wherein said second switching circuit is operated by said position signal to input said right control input signal to said third function generator when said palm rest is not in its neutral position, wherein said third switching circuit is operated by said position signal to input said pedal control signal to said third function generator when said palm rest is in its neutral position, wherein said third function generator produces a first output as a function of said pedal control signal and applies said first output to said fourth function generator to produce a forward or rearward speed signal for the one of the left and right traveling hydraulic motors corresponding to a larger one of said left control input signal and said right control input signal, and wherein said third function generator produces a second output as a function of said pedal control signal and a ratio of a smaller one of said left control input signal and said right control input signal to said larger one and applies said second output to said fifth function generator to produce a forward or rearward speed signal for the one of the left and right traveling hydraulic motors corresponding to the smaller one of said left control input signal and said right control input signal.

* * * * *

UNITED STATES PATENT AND TRADEMARK OFFICE
CERTIFICATE OF CORRECTION

PATENT NO. : 5,529,134
DATED : June 25, 1996
INVENTOR(S) : Makoto YOMOGITA

It is certified that error appears in the above-indentified patent and that said Letters Patent is hereby corrected as shown below:

Column 10, line 6, delete "claim 9," and insert
--claim 1,--.

Signed and Sealed this

Nineteenth Day of November, 1996

Attest:

BRUCE LEHMAN

Attesting Officer     Commissioner of Patents and Trademarks